US005511231A

United States Patent [19]
Ono

[11] Patent Number: 5,511,231

[45] Date of Patent: Apr. 23, 1996

[54] SELECTIVE CALLING RECEIVER CAPABLE OF STOPPING A NOTIFYING OPERATION BY TOUCHING A CHAIN CLIP

[75] Inventor: Hiroshi Ono, Tokyo, Japan

[73] Assignee: NEC Corporation, Tokyo, Japan

[21] Appl. No.: 262,932

[22] Filed: Jun. 21, 1994

[30] Foreign Application Priority Data

Jun. 21, 1993 [JP] Japan .................................. 5-173747

[51] Int. Cl.[6] .................................................. H04B 1/08

[52] U.S. Cl. .................. 455/38.2; 455/351; 340/825.44; 340/825.46

[58] Field of Search ................................ 455/38.2, 38.3, 455/38.4, 38.5, 347, 351, 100; 340/825.44, 825.46; 307/117

[56] References Cited

U.S. PATENT DOCUMENTS 4,037,221 7/1977 Alexander .
4,641,370 2/1987 Oyamada ................................ 455/351
4,668,876 5/1987 Skarman ................................ 307/117
4,831,279 5/1989 Ingraham ................................ 307/117
4,879,759 11/1989 Matsumoto et al. .

FOREIGN PATENT DOCUMENTS

0247601A3 5/1987 European Pat. Off. .
0010603 1/1977 Japan .................................... 455/351
U266044 5/1990 Japan .
0060538 3/1991 Japan .................................... 455/38.4
9111054 7/1991 WIPO .................................... 307/117

OTHER PUBLICATIONS

European Search Report EP 94 10 9587.

*Primary Examiner*—Andrew I. Faile
*Attorney, Agent, or Firm*—Whitham, Curtis, Whitham & McGinn

[57] ABSTRACT

A selective calling receiver includes a selective calling receiver main body, a chain clip, a detection circuit, and a control circuit. The selective calling receiver main body has a notification unit for performing a notifying operation when a numerical signal is received The chain clip includes a conductive metal chain and has one end connected to the selective calling receiver main body and the other end connected to a clip. The detection circuit is arranged in the selective calling receiver main body and is electrically connected to the chain clip to detect that a user touches a portion of the chain clip. The control circuit is arranged in the selective calling receiver main body and stops the notifying operation of the notification unit when an output is generated by the detection circuit in a notification enable state.

18 Claims, 6 Drawing Sheets

SELECTIVE CALLING RECEIVER CAPABLE OF STOPPING A NOTIFYING OPERATION BY TOUCHING A CHAIN CLIP

BACKGROUND OF THE INVENTION

The present invention relates to a selective calling receiver and, more particularly, to a selective calling receiver having a chain clip fastened to the clothes of a user to prevent the selective calling receiver from being removed from the clothes.

In recent years, selective calling receivers, each of which is a so-called a "pocket bell", always carried by a person, and called by a numerical signal in an emergency state or the like, have been popularly used. Some selective calling receiver generates a buzzer sound to notify a call, some selective calling receiver itself is vibrated to notify a call, and some selective calling receiver has both the notification modes. In addition, some selective calling receiver automatically stops a notifying operation a predetermined period of time after a notifying operation is started. However, when the selective calling receiver which automatically stops a notifying operation a predetermined period of time after a notifying operation is started is used, the notifying operation may be stopped before a user notices a call. For this reason, a selective calling receiver which stops a notifying operation by a manual switching operation performed by a user is popularly used.

FIG. 6 shows a conventional selective calling receiver. This conventional selective calling receiver comprises a reception antenna 11 for receiving a numerical signal; a receiver 12 for demodulating the received numerical signal; a signal decoder 13 for checking whether the numerical signal is a numerical signal for calling the self selective calling receiver and outputting the received call signal to a signal processing unit when the numerical signal is a numerical signal for calling the self selective calling receiver; an EEPROM (Electrically Erasable Programmable Read Only Memory) 15 which stores the predetermined identification number of the self selective calling receiver; a signal processing unit 14 for controlling a notifying operation for displaying a message in the numerical signal from the signal decoder 13 on a liquid crystal display (not shown) and calling a user; a manual switch 16 for stopping this notifying operation and switching a notification means; a switching detection circuit 17 for detecting depression of the manual switch 16; a tone generating circuit 18 for outputting a notification signal representing that the selective calling receiver user is called to a loudspeaker under the control of the signal processing unit 14; a loudspeaker 19 for outputting a buzzer sound under the control of the tone generating circuit 18; a motor drive circuit 20 for driving a motor to notify the selective calling receiver user of a call; and a motor 21 driven and rotated by the motor drive circuit 120 to generate a vibration.

The manual switch 16 is a self-reset switch which is turned on by manually depressing it with a finger and turned off by releasing the finger from the manual switch 16. When the manual switch 16 is turned on in a call notification state, a notification mode in which notification is performed by the buzzer sound and a notification mode in which notification is performed by the vibration can be switched therebetween each time the switch 16 is turned on. In addition, when the manual switch 16 is turned on in a call notification state, the notifying operation can be stopped. The notifying operation can continue in the call notification state unless the manual switch 16 is turned on.

Some conventional selective calling receiver has a chain clip fastened to the clothes or the like of a user to prevent the selective calling receiver from being removed from the clothes. This chain clip is formed by connecting a clip to the distal end of a chain. The clip is fastened to a portion of the clothes to prevent the selective calling receiver from being removed from the clothes.

However, when the conventional selective calling receiver is called, and a user notices the notifying operation of the selective calling receiver and wants to stop the notifying operation, if the user carries the selective calling receiver in his/her pocket, the user must put his/her hand in the pocket to search a manual switch for stopping the notifying operation. This searching is very cumbersome if the user is in a crowded train in commuter rush hours or the like. Therefore, the selective calling receiver cannot be easily handled.

In addition, when a third party is present together with a selective calling receiver user as in a crowded train, a buzzer sound or vibration for a notifying operation disturbs the third party. For this reason, when the user tries to quickly stop the notifying operation in haste, a time taken for stopping the notifying operation is undesirably prolonged against the will of the user.

SUMMARY OF THE INVENTION

It is an object of the present invention to provide a selective calling receiver capable of easily stopping a notifying operation.

It is another object of the present invention to provide a selective calling receiver which can be easily handled.

In order to achieve the above objects, according to the present invention, there is provided a selective calling receiver comprising a selective calling receiver main body, having notification means for calling, for driving the notification means when a numerical signal is received to perform a notifying operation, a chain clip entirely consisting of a conductive metal and having one end connected to the selective calling receiver main body and the other end connected to a clip, detection means, arranged in the selective calling receiver main body and electrically connected to the chain clip, for detecting that a user touches a portion of the chain clip with his/her hand, and control means, arranged in the selective calling receiver main body, for stopping the notifying operation of the notification means when an output is generated by the detection means in a notification enable state.

DESCRIPTION OF THE PREFERRED EMBODIMENT

Figure 1:
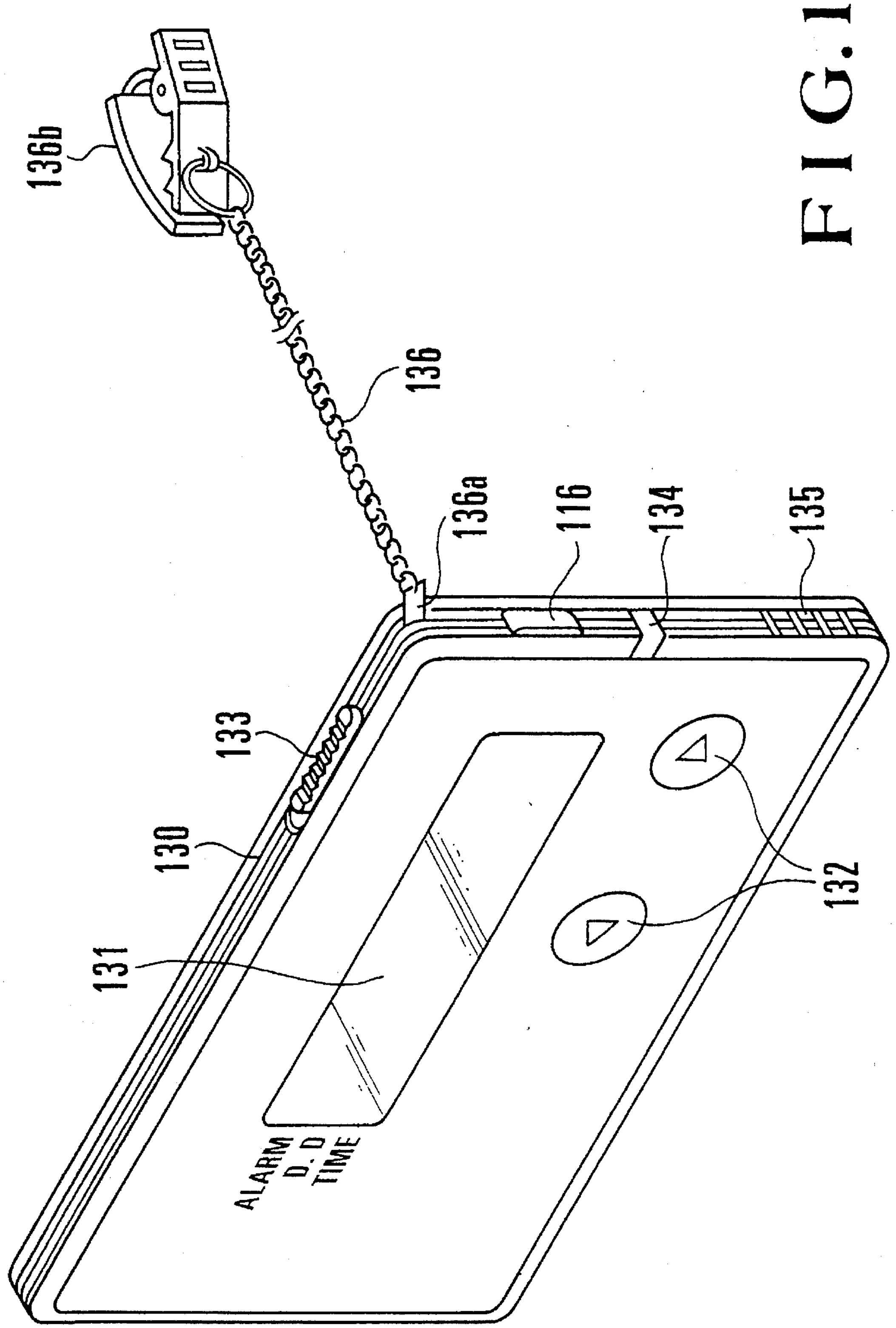
FIG. 1 is a perspective view showing an embodiment of a selective calling receiver according to the present invention.

The present invention will be described below with reference to the accompanying drawings. FIG. 1 shows an embodiment of a selective calling receiver according to the present invention. A liquid crystal display 131 is arranged on the front surface of a cabinet 130, and can display a message included in a received numerical signal or preset time. In addition, reference numeral 132 denotes operation buttons 132 used for displaying a message which has been received by the selective calling receiver again or setting time.

When a power supply switch 133 is turned on, the selective calling receiver is set in a state wherein a numerical signal can be received. When the selective calling receiver is called by a numerical signal and set in a notification enable state, an LED 134 is flickered. At this time, when a buzzer sound mode is selected as a notification mode, a buzzer sound is output from a loudspeaker arranged in a loudspeaker hole 135. A chain clip 136 consists of a conductive metal, a conductive metal member 136*a* is connected to the distal end of the chain clip, and this metal member 136*a* is inserted in the cabinet 130 to be electrically and physically connected to the selective calling receiver. Reference numeral 136*b* denotes a clip connected to one of the chain clip 136.

Figure 2:
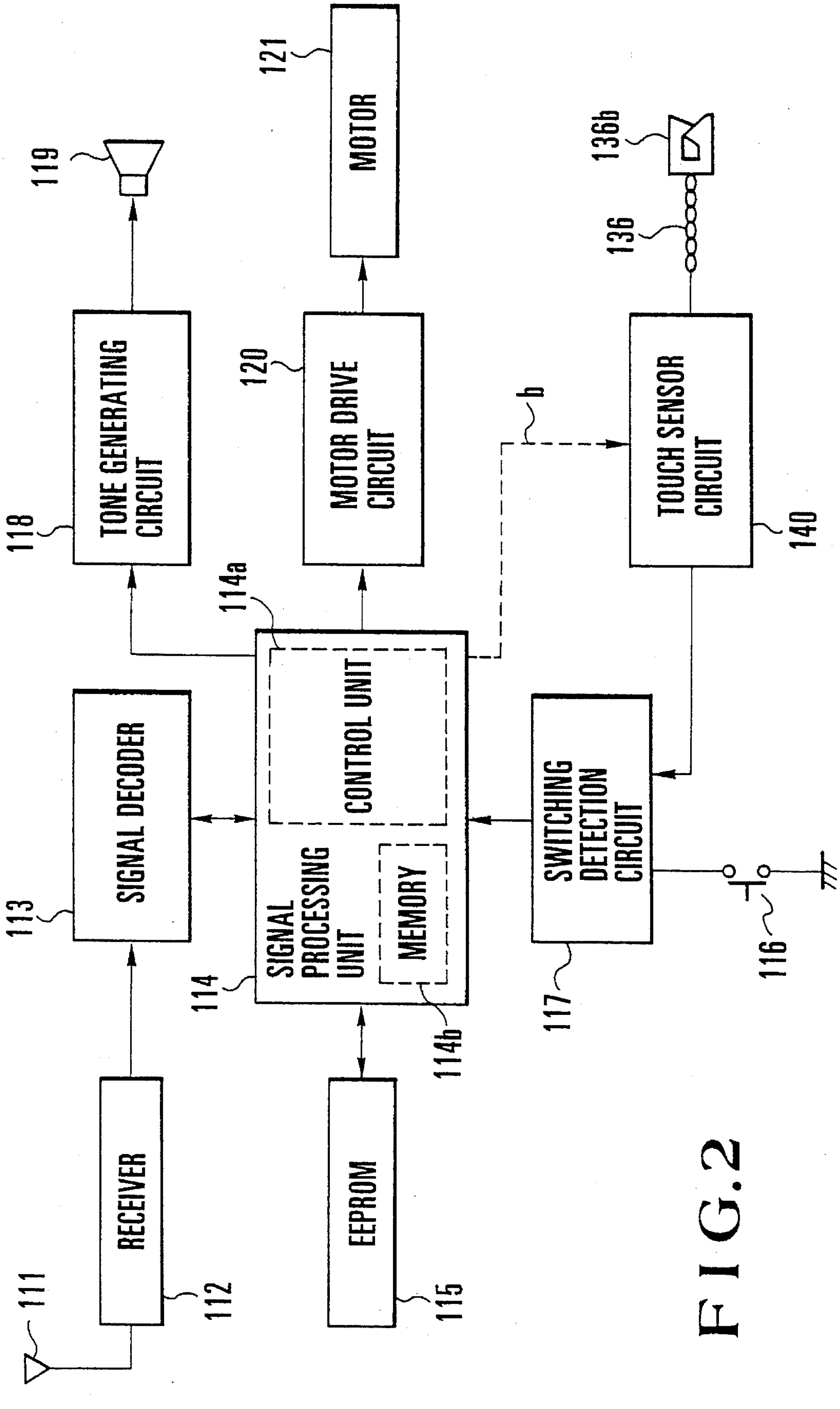
FIG. 2 is a block diagram showing the circuit arrangement of the selective calling receiver in FIG. 1.

FIG. 2 shows the circuit block of the selective calling receiver shown in FIG. 1. This selective calling receiver comprises a reception antenna 111 for receiving a numerical signal; a receiver 112 for demodulating the received numerical signal; a signal decoder 113 for checking whether the numerical signal is a numerical signal for calling the self selective calling receiver and outputting the received call signal to a signal processing unit when the numerical signal is a numerical signal for calling the self selective calling receiver; an EEPROM 115 which stores the predetermined identification number of the self selective calling receiver; a signal processing unit 114 for displaying a message in the numerical signal from the signal decoder 113 on a liquid crystal display (not shown) to call a user; a manual switch 116 for stopping this notifying operation and switching a notification means; a switching detection circuit 117 for detecting depression of the manual switch 116; a tone generating circuit 118 for outputting a notification signal representing that the selective calling receiver user is called to a loudspeaker under the control of the signal processing unit 114; a loudspeaker 119 for outputting a buzzer sound under the control of the tone generating circuit 118; a motor drive circuit 120 for driving a motor to notify the selective calling receiver user of a call; a motor 121 driven and rotated by the motor drive circuit 120 to generate a vibration; and a touch sense circuit 140 for detecting that the selective calling receiver user touches the metal chain clip 136 with his/her hand. The signal processing unit 114 comprises a control unit 114*a* for performing notifying operation stop control and notification mode change control in response to a detection signal from the switching circuit 117 in a notification enable state and a notification disable state, respectively; and a memory 114*b* for storing a notification mode selected by the control unit 114*a*.

When the selective calling receiver user touches the metal chain clip 136 with his/her hand, a noise voltage component collected by the human body serving as an antenna is input to the touch sense circuit 140 through the chain clip 136. The touch sense circuit 140 detects a voltage amplitude obtained after the input noise voltage component is rectified to detect that the user touched the chain clip 136 with his/her hand.

Figure 3:
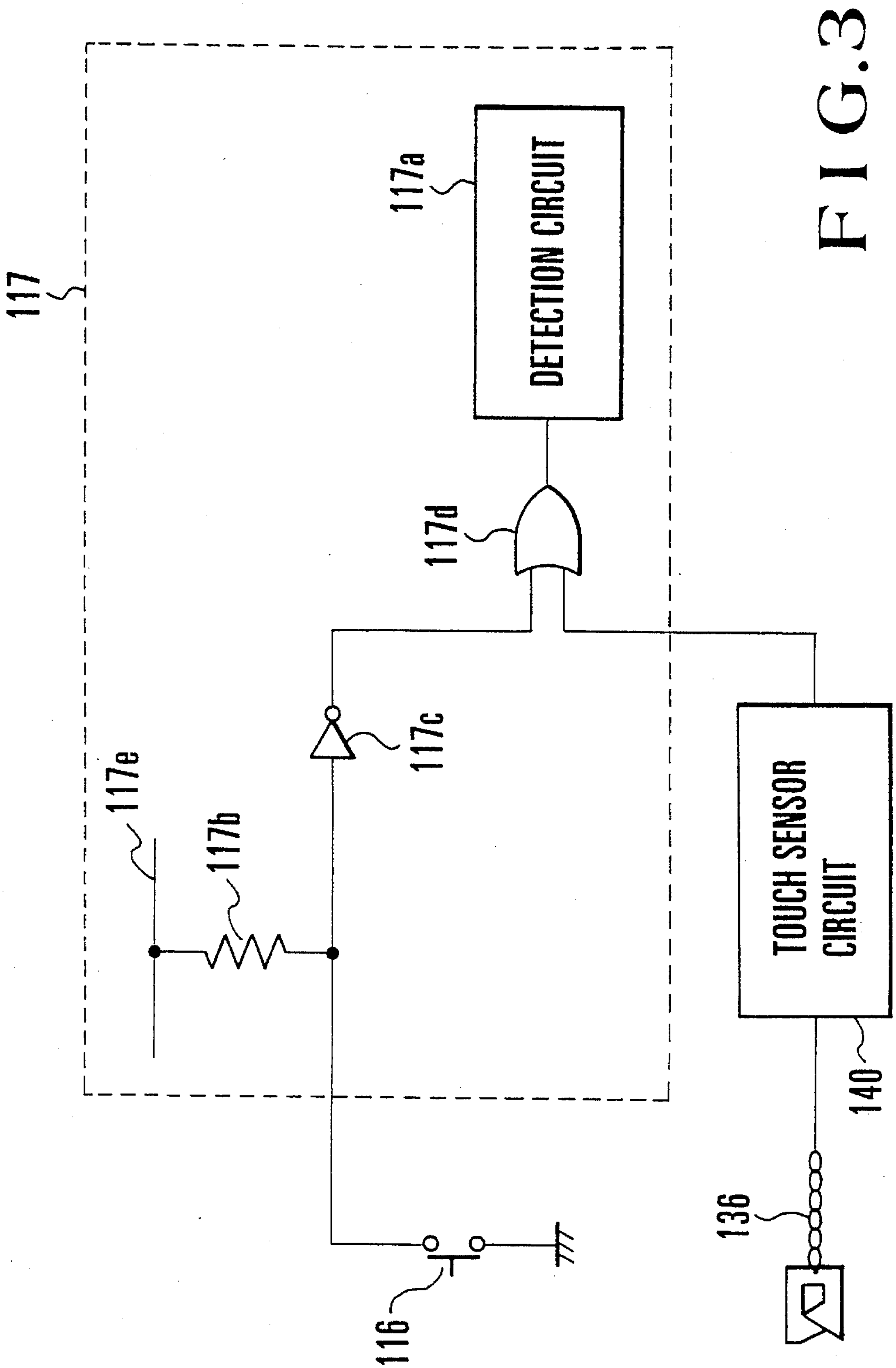
FIG. 3 is a circuit diagram showing an example of a switching detection circuit in FIG. 2.

FIG. 3 shows the internal arrangement of the switching circuit 117 shown in FIG. 2. The switching circuit 117 comprises an inverter 117*c* having an input side pulled up to a power supply line 117*e* by a pull-up resistor 117*b*; an OR circuit 117*d* using the output of the inverter 117*c* and the output of the touch sense circuit 140 as two inputs; and a detection circuit 117*a* for detecting an output signal from the OR circuit 117*d*. A voltage of, e.g., 5 V is applied to the power supply line 117*e*, and a voltage of 5 V ("1"-level signal) is applied to the inverter 117*c* when the manual switch 116 is turned on. When the manual switch 16 is turned on, voltage drop occurs across the pull-up resistor 117*b*, and a voltage of 0 V ("0"-level signal) is input to the inverter 117*c*. The inverter 117*c* inverts the input signal to output the inverted signal.

On the other hand, the touch sense circuit 140 outputs a "1"-level signal when the user touches the chain clip 136 with his/her hand, and outputs a "0"-level signal when the user does not touch the chain clip 136 with his/her hand. An output from the inverter 117*c* and an output from the touch sense circuit 140 are input to the OR circuit 117*d*. The OR circuit 117*d* outputs a "1"-level signal when one or both of the two inputs of the OR circuit 117*d* are set at "1" level, and outputs a "0"-level signal when both the inputs are set at "0" level.

Figure 4:
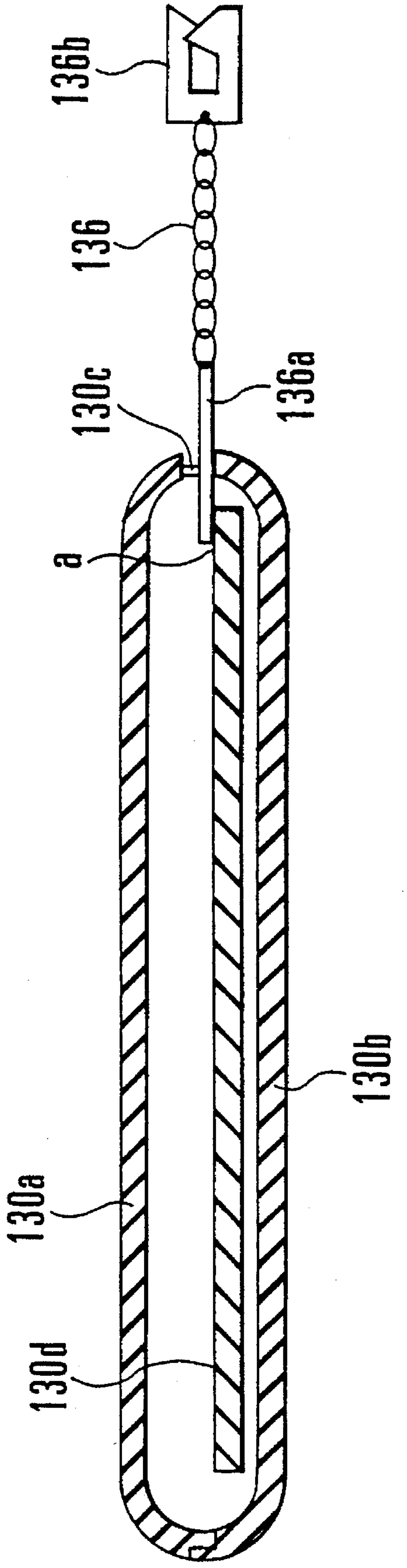
FIG. 4 is a schematic sectional view showing the selective calling receiver in FIG. 1.

FIG. 4 shows the section of the connection portion between the cabinet 130 and the metal member 136*a* shown in FIG. 1. The cabinet 130 comprises a cabinet cover 130*a* and a cabinet case 130*b*. A printed board 130*d* on which the circuits shown in FIG. 2 are mounted is arranged inside the cabinet 130. The metal member 136*a* connected to the distal end of the chain clip 136 is inserted into a portion between the cabinet cover 130*a* and the cabinet case 130*b* and fixed with a pin 130*c*.

A copper foil pattern a, connected to the touch sense circuit 140 mounted on the printed board 130*d*, is formed on a portion of the mounted surface of the printed board 130*d*. Since the copper foil pattern a on the printed board 130*d* is always in contact with the metal member 136*a*, the chain clip 136 is electrically connected to the touch sense circuit 140 through the metal member 136*a* and the copper foil pattern a.

The selective calling receiver according to the present invention is used in, e.g., a pocket of clothes. In this case, the selective calling receiver is used such that the clip 136*b* of the chain clip 136 is fastened to the edge of the pocket.

Figure 5:
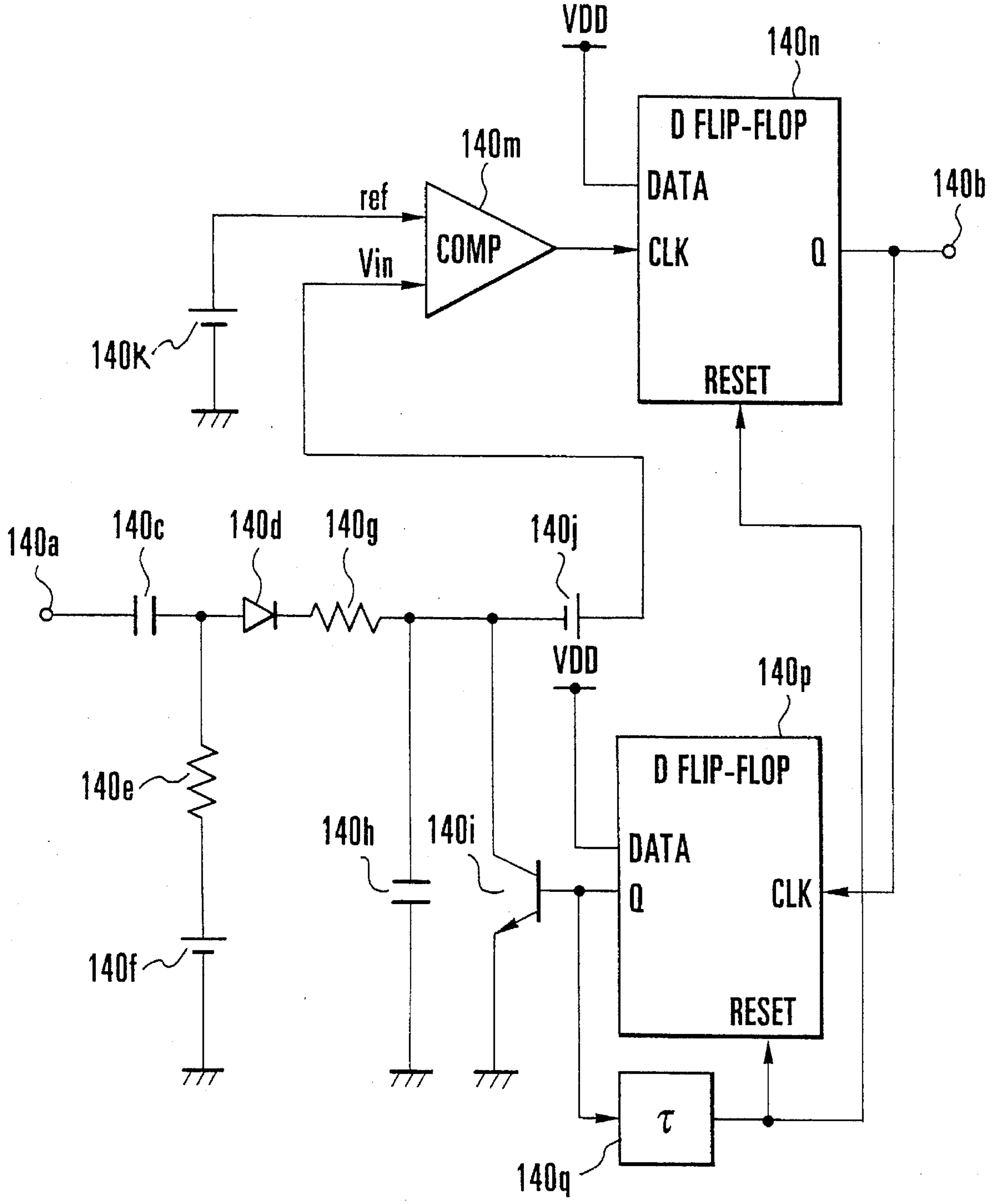
FIG. 5 is a circuit diagram showing an example of a touch sense circuit in FIG. 2.
Figure 6:
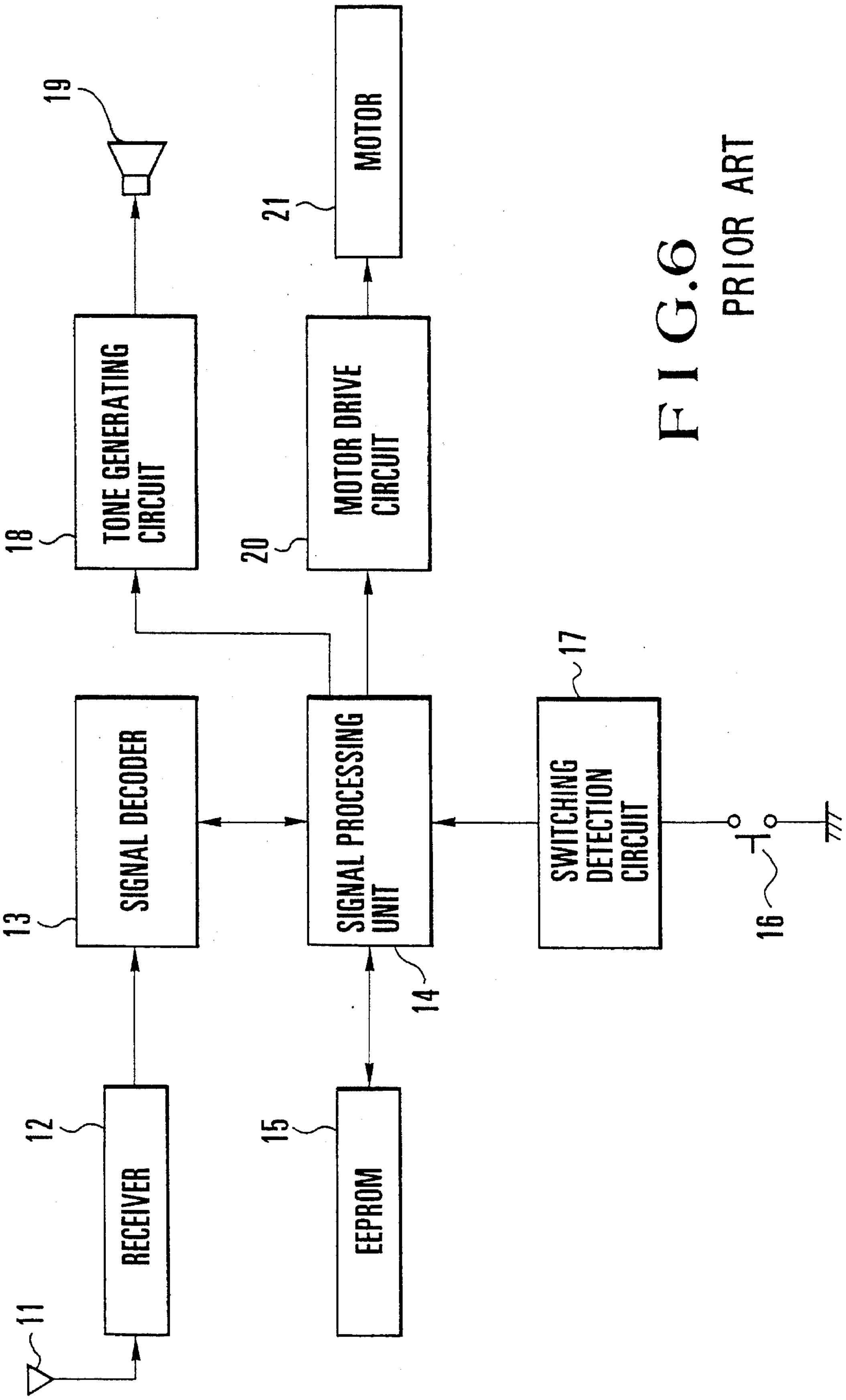
FIG.6 PRIOR ART
FIG. 6 is a block diagram showing the circuit arrangement of a conventional selective calling receiver.

FIG. 5 shows the internal arrangement of the touch sense circuit 140. The chain clip 136 is connected to an input terminal 140*a*, and an output terminal 140*b* is connected to the OR circuit 117*d*. The internal structure of the touch sense circuit 140 is constituted by capacitors 140*c* and 140*h*, DC power supplies 140*f*, 140*j*, and 140*k*, a diode 140*d*, a transistor 140*i*, a comparator 140*m*, D flip-flops 140*n* and 140*p*, a delay circuit 140*q*, and resistors 140*e* and 140*g*. The voltage of the DC power supply 140*f* is set to be a value equal to a forward voltage of the diode 140*d*, and the voltages of the DC power supplies 140*k* and 140*j* are determined such that noise is rectified by the diode 140*d* and a value obtained by adding a voltage generated by the capacitor 140*h* to the voltage of the DC power supply 140*j* is slightly higher than that of the voltage of the DC power supply 140*k*. The comparator 140*m* supplies a "1"-level signal when a voltage supplied through the DC power supply 140*j* is higher than the voltage of the DC power supply 140*k*. Note that the DC power supply 140*f* is arranged to apply a bias voltage to the diode 140*d* and to make the capacitor 140*h* chargeable with a low voltage, and the DC power supply 140*j* is added to stably compare input signals with each other.

An operation of the selective calling receiver according to this embodiment will be described below with reference to FIGS. 1 to 3. When the power supply switch 133 shown in FIG. 1 is turned on, the signal processing unit 114 reads out the identification number of the self selective calling receiver from the EEPROM 115 to output the identification number to the signal decoder 113. The signal decoder 113 stores, in an internal memory (not shown), the identification number input from the signal processing unit 114.

In a call notification disable state, the manual switch 116 is turned on, or the user touches the chain clip 136 with his/her hand. At this time, the switching detection circuit 117 detects that the manual switch 116 is turned on or that the user touches the chain clip 136 with his/her hand, and informs the signal processing unit 114 of it. The control unit 114*a* of the signal processing unit 114 switches a call notification mode stored in the signal processing unit 114 in a predetermined order each time the switching detection circuit 117 informs the signal processing unit 114 of the ON state of the manual switch 116 or touching to the chain clip 136. When two notification modes are used, these notification modes are alternately switched. In this case, a description will be made assuming that a notification mode is set and stored as a notification mode in which a notifying operation is performed by a buzzer sound.

When the reception antenna 111 receives a numerical signal, the signal is demodulated in the receiver 112 and then input to the signal decoder 113. The signal decoder 113 compares the identification number of the self selective calling receiver stored in the internal memory of the signal decoder 113 with the identification number included in the received numerical signal to check whether the self selective calling receiver receives a selective call for the self selective calling receiver. If the self selective calling receiver receives no numerical signal for the self selective calling receiver, the signal decoder 113 neglects the received signal; if the self selective calling receiver receives a selective call for the self selective calling receiver, the signal decoder 113 outputs the received numerical signal to the signal processing unit 114. Note that the identification number of the self selective calling receiver may be read from the EEPROM 115 each time the selective calling receiver receives a numerical signal. In this case, the internal memory of the signal decoder 113 can be omitted.

The signal processing unit 114 which receives a numerical signal displays a message (the telephone number of a person who calls the self selective calling receiver, a matter of business, or the like) included in the numerical signal on the liquid crystal display 131, and flickers the LED 134 serving as a fixed notification means for calling. In addition, in accordance with a notification mode stored in the memory 114*b*, the control unit 114*a* directs the tone generating circuit 118 to output a buzzer sound. When the tone generating circuit 118 is designated to output the buzzer sound, the tone generating circuit 118 controls the loudspeaker 119 to output the buzzer sound.

When the selective calling receiver user notices the buzzer sound for notifying the user that the selective calling receiver is called, the user touches the chain clip 136 including the clip 136*b* fastened to the edge of the pocket with his/her hand.

Noise components around the user are collected by the human body serving as an antenna, and are input to the touch sense circuit 140. The input noise components, as shown in FIG. 5, are supplied to the diode 140*d* through the input terminal 140*a* and the capacitor 140*c*. Since the diode 140*d* is applied with a forward bias voltage by the DC power supply 140*f*, although the forward component of the noise components is a low voltage, the forward component passes through the diode 140*d* to charge the capacitor 140*h* through the resistor 140*g*. However, the reverse component of the noise components is interrupted by the diode 140*d* not to charge the capacitor 140*h*.

The voltage charged in the capacitor 140*h* is added to the voltage of the DC power supply 140*j*. When the resultant voltage becomes higher than that of the DC power supply 140*k*, the comparator 140*m* generates a "1"-level output signal and supplies it to a clock input terminal CLK of the flip-flop 140*n*. In this manner, the flip-flop 140*n* loads the voltage of a power supply VDD supplied to a data terminal DATA and outputs a "1"-level signal from the Q output terminal. This signal is supplied to a clock input terminal CLK of the flip-flop 140*p*, and the flip-flop 140*p* which loaded the voltage of the power supply VDD supplied to a data terminal DATA of the flip-flop 140*p* outputs a "1"-level signal from the Q output terminal. In this manner, the transistor 140*i* is turned on, and charges accumulated in the capacitor 140*h* are discharged by the transistor 140*i*. For this reason, the level of an output from the comparator 140*m* is switched to "0" level.

The signal output from the Q output terminal of the flip-flop 140*p* is delayed by the delay circuit 140*q* by a predetermined period of time, and is input to reset terminals RESET of the flip-flops 140*n* and 140*p* to reset these flip-flops. Therefore, a "1"-level signal is output from the output terminal 140*b* for a predetermined period of time set by the delay circuit 140*q* after the user touches the chain clip 136 with his/her hand.

As a result, the touch sense circuit 140 detects that the user touched the chain clip 136 with his/her hand and outputs a "1"-level signal to the switching circuit 117. For this reason, the control unit 114*a* of the signal processing unit 114 which receives a notification stop request through the switching circuit 117 causes the tone generating circuit 118 to stop the notifying operation.

On the other hand, when the user touches the chain clip 136 with his/her hand in a notification disable state, as in a notification enable state, a "1"-level signal is input from the touch sense circuit 140 to the signal processing unit 114 through the switching circuit 117. In this manner, the control unit 114*a* of the signal processing unit 114 switches the notification mode stored in the memory 114*b* to the motor 121.

When the manual switch 116 is operated, a "1"-level signal is input to the signal processing unit 114 through the switching circuit 117, the control unit 114*a* of the signal processing unit 114 stops a notifying operation in the notification enable state, and the control unit 114*a* switches the notification mode stored in the memory 114*b* in the notification disable state.

In the above embodiment, the call notification mode changes when the user touches the chain clip 136 with his/her hand in the notification disable state. However, a change in notification mode caused by a touch to the chain clip 136 in the notification disable state may be inhibited as follows. That is, the transistor 140*i* in FIG. 5 is forcibly set in an ON state by a control signal b output from the control unit 114*a* (indicated by a dotted line in FIG. 2) of the signal processing unit 114 in the notification disable state so as to stop the operation of the touch sense circuit 140. Even if a signal input path from the touch sense circuit 140 to the switching detection circuit 117 is interrupted, the same effect as described above can be obtained. In this case, the chain clip 136 is used only to stop a notifying operation, and an undesirable change in notification mode can be prevented.

The present invention can also be applied to a selective calling receiver which has a plurality of identification numbers of a self selective calling receiver and in which a notification tone is changed for each called identification number to identify a calling side (originating side).

As has been described above, according to the present invention, since a selective calling receiver is designed to stop a notifying operation when a user touches the chain clip with his/her hand, the notifying operation can be easily stopped, and the selective calling receiver can be easily handled. In addition, a notification mode is changed when the user touches the chain clip with his/her hand in a notification disable state, thereby obtaining an effect that the notification mode can be easily changed. Since a notifying operation can be stopped by operating the notification stop switch or touching the chain clip with a hand, an enhanced effect that a high degree of freedom in operations can be obtained.

What is claimed is:

1. A selective calling receiver comprising:

a selective calling receiver main body having notification means for performing a notifying operation when a numerical signal is received;

a chain clip comprising a conductive metal chain and a clip coupled thereto, said chain having a first end connected to said selective calling receiver main body and a second end connected to said clip;

detection means, located in said selective calling receiver main body and electrically connected to said chain clip, for detecting contact between a user and said chain clip; and control means, located in said selective calling receiver main body, for stopping the notifying operation when a predetermined output is generated by said detection means.

2. A selective calling receiver according to claim 1, wherein said notification means has a plurality of notification modes having a predetermined order, and said control means controls said notification means to change the notification mode in accordance with the predetermined order when a second predetermined output is generated by said detection means.

3. A selective calling receiver according to claim 2, further comprising a memory for storing one of the plurality of notification modes stored in said notification means and updating and storing a next notification mode when the second predetermined output is generated by said detection means, wherein said control means selects a notification mode of said notification means in accordance with the notification mode stored in said memory when the numerical signal is received.

4. A selective calling receiver according to claim 2, wherein said notification means comprises a sound generating device and a vibration generating device for respectively generating a sound and a vibration serving as the plurality of notification modes for performing said notifying operation.

5. A selective calling receiver according to claim 2, wherein said second predetermined output is generated when said calling receiver is in a notification disable state.

6. A selective calling receiver according to claim 1, further comprising a manual switch for stopping said notifying operation, wherein said notification means has a plurality of notification modes having a predetermined switching order, said control means stops said notifying operation when a predetermined output is generated by said manual switch, and controls said notification means when a second predetermined output is generated by said manual switch, thereby changing a notification mode in accordance with the predetermined order.

7. A selective calling receiver according to claim 6, further comprising logical OR means for receiving outputs of said detection means and said manual switch, and for outputting a logical OR output to said control means.

8. A selective calling receiver according to claim 6, wherein the predetermined output from either said detection means or said manual switch means is generated when said calling receiver is in a notification enable state and said second predetermined output is generated when said calling receiver is in a notification disable state.

9. A selective calling receiver according to claim 1, further comprising:

a conductive metal member connected to said first end of said chain and said selective calling receiver main body; and a printed board having a pattern, said printed board being in contact with said metal member and said detection means.

10. A selective calling receiver according to claim 1, wherein said detection means comprises a touch sense circuit including a capacitor charged by noise components input when there is contact between said user and said chain clip and a comparator for detecting that a charge voltage of said capacitor becomes not less than a predetermined value.

11. A selective calling receiver according to claim 1, wherein said predetermined output is generated when said calling receiver is in a notification enable state.

12. A selective calling receiver comprising:

a selective calling receiver main body, including notification means having a plurality of notification modes;

said notification modes having a predetermined order;

said notification means for performing a notifying operation in accordance with one of the plurality of notification modes when a numerical signal is received;

a manual switch for stopping the notifying operation;

a chain clip comprising a clip and a conductive metal chain having a first end connected to said selective calling receiver main body and a second end connected to said clip;

detection means, located in said selective calling receiver main body and electrically connected to said chain clip, for detecting contact between a user and said chain clip; and control means, located in said selective calling receiver main body, for stopping the notifying operation when a predetermined output is generated by one of said manual switch and said detection means, said control means controlling said notification means when a second predetermined output is generated by said manual switch, thereby changing a notification mode in accordance with the predetermined order.

13. A selective calling receiver according to claim 12, wherein said control means controls said notification means when said second predetermined output is generated by said detection means, thereby changing the notification mode in accordance with the predetermined order.

14. A selective calling receiver according to claim 13, wherein said second predetermined output is generated when said calling receiver is in a notification disable state.

15. A selective calling receiver according to claim 12, wherein the predetermined output from either said detection means or said manual switch means is generated when said calling receiver is in a notification enable state and said second predetermined output is generated when said calling receiver is in a notification disable state.

16. A selective calling receiver comprising:

a receiver main body, having notification means for performing a notifying operation when a numerical signal is received;

said notification means having a plurality of notification modes having a predetermined order;

a chain clip comprising a clip and a conductive metal chain having a first end connected to said receiver main body and a second end connected to said clip;

detection means, located in said receiver main body and electrically connected to said chain clip, for detecting contact between a user and said chain clip; and control means, located in said receiver main body, for controlling the notifying operation in accordance with reception of the numerical signal, wherein said notification means changes the notification mode in accordance with the predetermined order when a predetermined output is generated by said detection means.

17. A receiver according to claim 16, wherein said notification means comprises a sound generating device and a vibration generating device for respectively generating a sound and a vibration serving as the plurality of notification modes for performing said notifying operation.

18. A selective calling receiver according to claim 16, wherein said predetermined output is generated when said calling receiver is in a notification disable state.

* * * * *